US012724445B2

(12) United States Patent
Tian et al.

(10) Patent No.: US 12,724,445 B2
(45) Date of Patent: Sep. 1, 2026

(54) ROCKER DEVICE

(71) Applicant: SHANGHAI FLYDIGI ELECTRONICS TECHNOLOGY CO., LTD., Shanghai (CN)

(72) Inventors: Hang Tian, Shanghai (CN); Yawu Zhang, Shanghai (CN); Wei Huang, Shanghai (CN); Shanpeng Ke, Shanghai (CN); Wen Fan, Shanghai (CN); Hongbo Liu, Shanghai (CN)

(73) Assignee: SHANGHAI FLYDIGI ELECTRONICS TECHNOLOGY CO., LTD., Shanghai (CN)

( * ) Notice: Subject to any disclaimer, the term of this patent is extended or adjusted under 35 U.S.C. 154(b) by 240 days.

(21) Appl. No.: 18/476,260

(22) Filed: Sep. 27, 2023

(65) Prior Publication Data

US 2025/0036153 A1 Jan. 30, 2025

Related U.S. Application Data

(63) Continuation of application No. PCT/CN2023/114093, filed on Aug. 21, 2023.

(30) Foreign Application Priority Data

Jul. 25, 2023 (CN) ......................... 202310925560.7

(51) Int. Cl.

| | |
|---|---|
| ***G05G 1/04*** | (2006.01) |
| ***G05G 1/015*** | (2008.04) |
| ***G05G 5/05*** | (2006.01) |

(52) U.S. Cl.
CPC ............... *G05G 1/04* (2013.01); *G05G 1/015* (2013.01); *G05G 5/05* (2013.01); *G05G 2505/00* (2013.01)

(58) Field of Classification Search
CPC ............ G05G 1/04; G05G 1/015; G05G 5/05; G05G 2505/00; H01H 3/04; H01H 23/02;
(Continued)

(56) References Cited

U.S. PATENT DOCUMENTS

| | | | | |
|---|---|---|---|---|
| 2025/0128151 A1* | 4/2025 | Yu | ............................ | G05G 1/04 |
| 2025/0238051 A1* | 7/2025 | Ke | ............................ | G05G 1/08 |

FOREIGN PATENT DOCUMENTS

| | | |
|---|---|---|
| CN | 1204970 A | 1/1999 |
| CN | 1920729 A | 2/2007 |

(Continued)

OTHER PUBLICATIONS

International Search Report,International Application No. PCT/CN2023/114093, mailed Nov. 24, 2023 (13 pages).

(Continued)

*Primary Examiner* — Lheiren Mae A Caroc

(57) ABSTRACT

The present application provides a rocker device, the rocker device includes a supporting base, a rocker, a deviating element, and a reset assembly. The rocker is provided with a pressing part. The deviating element includes a first end and a second end opposite to each other, and the first end is in contact with the pressing part. The reset assembly is disposed on the second end. When the pressing part presses the first end of the deviating element, the second end of the deviating element deviates, and the reset assembly drives the second end of the deviating element to reset. The assembly of the rocker device in the present application is simple, reducing a frictional resistance between the deviating element and the supporting base, thereby improving usage experience.

18 Claims, 9 Drawing Sheets

(58) Field of Classification Search
CPC ........ H01H 23/12; H01H 23/14; H01H 23/16; H01H 23/162; H01H 23/24; H01H 2221/016
See application file for complete search history.

(56) References Cited

FOREIGN PATENT DOCUMENTS

| | | | |
|---|---|---|---|
| CN | 203077460 | U | 7/2013 |
| CN | 104139701 | A | 11/2014 |
| CN | 103623593 | B | 8/2016 |
| CN | 205609414 | U | 9/2016 |
| CN | 106205566 | A | 12/2016 |
| CN | 107066025 | A | 8/2017 |
| CN | 206541219 | U | 10/2017 |
| CN | 109414614 | A | 3/2019 |
| CN | 211956260 | U | 11/2020 |
| CN | 212135269 | U | 12/2020 |
| CN | 214427846 | U | 10/2021 |
| CN | 217181454 | U | 8/2022 |
| CN | 114995584 | A | 9/2022 |
| CN | 217902335 | U | 11/2022 |
| CN | 220357482 | U | 1/2024 |
| JP | 2017117324 | A | 6/2017 |

OTHER PUBLICATIONS

Chinese Notification to Grant Patent Right for Invention, Chinese Application No. 202321975252.7, mailed Dec. 7, 2023 (3 pages).
Chinese Notification to Grant Patent Right for Invention, Chinese Application No. 202321973665.1, mailed Nov. 26, 2023 (3 pages).
Chinese First Office Action,Chinese Application No. 202310925560.7, mailed Sep. 27, 2025 (21 pages).
Japanese First Notice of Reasons for Refusal,Japanese Patent Application No. 2024-524430, mailed Nov. 11, 2025 (10 pages).
Chinese Second Office Action,Chinese Application No. 202310925560.7, mailed Mar. 31, 2026 (20 pages).
Japanese Decision to Grant a Patent, Japanese Application No. 2024-524430, mailed Feb. 24, 2026 (5 pages).

* cited by examiner

ROCKER DEVICE

CROSS REFERENCE TO REPLATED APPLICATIONS

The present application is a continuation of International (PCT) Patent Application No. PCT/CN2023/114093 filed on Aug. 21, 2023, which claims priority to Chinese Patent Application No. 202310925560.7, entitled "ROCKER DEVICE", filed on Jul. 25, 2023, the contents of all of which are hereby incorporated by reference in their entirety.

TECHNICAL FIELD

The present disclosure relates to the technical field of controllers, and in particular to a rocker device.

BACKGROUND

A rocker in the existing rocker device may automatically reset under the action of a reset mechanism. The reset mechanism includes a movable part and a reset spring. The reset spring and the movable part are all located below the rocker. The reset spring, the movable part, and the rocker are all coaxial.

During the assembly process of the rocker device mentioned above, it is necessary to ensure that the reset spring, the movable part, and the rocker are all coaxial to achieve the return of the rocker, resulting in high difficulty of assembling the rocker device. A friction force between the movable part and the supporting base is also increased.

SUMMARY OF THE DISCLOSURE

The present disclosure provides a rocker device. The rocker device includes a supporting base, a rocker provided with a pressing part, a deviating element including a first end and a second end opposite to each other, and a reset assembly disposed on the second end. The first end is in contact with the pressing part. When the pressing part presses the first end of the deviating element, the second end of the deviating element deviates. The reset assembly is configured to drive the second end of the deviating element to reset.

In some embodiments, the deviating element is pivotally connected to the supporting base through a rotating shaft.

In some embodiments, the rotating shaft is located between the first end and the second end, and is closer to the second end than the first end.

In some embodiments, each of two ends of the deviating element is provided with the rotating shaft, each of two ends of the supporting base is provided with a rotating shaft groove, and the rotating shaft rotates in the rotating shaft groove. Alternatively, each of the two ends of the deviating element is provided with the rotating shaft groove, each of the two ends of the supporting base is provided with the rotating shaft, and the rotating shaft rotates in the rotating shaft groove.

In some embodiments, a hard layer is disposed on an end face of the first end facing towards the pressing part.

In some embodiments, the pressing part includes a bottom wall, and an outer circumference of the bottom wall is provided with an inclined surface.

In some embodiments, the reset assembly includes an elastic element configured to reset the deviating element and an adjusting assembly configured to limit the elastic element.

In some embodiments, the adjusting assembly is adjustable and fixed to the supporting base, and the adjusting assembly is configured to adjust an elastic force of the elastic element.

In some embodiments, the adjusting assembly includes a first adjusting element, the first adjusting element passes through the second end and is connected to the supporting base, and the elastic element is sleeved on the first adjusting element; and one end of the elastic element is in contact with an end of the first adjusting element away from the second end, and the other end of the elastic element is in contact with a side surface of the second end away from the supporting base.

In some embodiments, the first adjusting element passes through the second end and is threaded to the supporting base.

In some embodiments, the adjusting assembly includes a first connecting element disposed in the supporting base, and the first adjusting element is threaded to the first connecting element.

In some embodiments, the adjusting assembly includes a second adjusting element and a pressing block, and the second adjusting element passes through one end of the pressing block and is connected to the second end; and one end of the elastic element is connected to the other end of the pressing block, and the other end of the elastic element is connected to the supporting base.

In some embodiments, the second adjusting element is threaded to the second end.

In some embodiments, the adjusting assembly includes a second connecting element, the second connecting element is disposed in the second end, and the second connecting element is threaded to the second adjusting element. At least one snap ring is sleeved on the second adjusting element, and the at least one snap ring is located between the pressing block and the second adjusting element.

In some embodiments, the second end is provided with a limiting position column parallel to the second adjusting element, and the limiting position column passes through the pressing block.

In some embodiments, the adjusting assembly includes a third adjusting element and a driving element, and the third adjusting element is spaced apart from the second end; one end of the elastic element is connected to an end of the third adjusting element away from the second end, and the other end of the elastic element is connected to the second end; and the driving element is located on a side of the third adjusting element away from the elastic element, the driving element is configured to drive the third adjusting element to move towards the second end, and configured to change the elastic force of the elastic element.

In some embodiments, the driving element includes a rotating cover, and the rotating cover is configured to rotate relative to the third adjusting element, to adjust the elastic force of the elastic element.

In some embodiments, a track groove is disposed in the rotating cover, and the third adjusting element is configured to slide in the track groove and abut against the track groove.

In some embodiments, the rocker device includes a rocker arm assembly and the rocker, the rocker is fixedly connected to the rocker arm assembly, and the rocker arm assembly is configured to rotate with a tilting operation of the rocker.

In some embodiments, the rocker arm assembly includes a first rocker arm and a second rocker arm, and the pressing part is disposed on an end of the first rocker arm facing towards the deviating element; and the first rocker arm is configured to rotate relative to the second rocker arm along a first direction, the second rocker arm is configured to rotate relative to the supporting base along a second direction, and the first direction is orthogonal to the second direction.

In some embodiments, the second rocker arm defines an installing chamber with an opening, and two ends of the first rocker arm are configured to rotate in the installing chamber. The rocker includes a connecting part, and the connecting part is connected to the first rocker arm and protrudes from a surface of the second rocker arm through the opening.

In some embodiments, each of the two ends of the first rocker arm is provided with a first fixing shaft, the rocker arm assembly includes two first bearing elements, and each of the two first bearing elements is sleeved on a corresponding one of two first fixing shafts, so that the first rocker arm rotates relative to the second rocker arm. Each of two ends of the second rocker arm is provided with a second fixing shaft, the rocker arm assembly includes two second bearing elements, and each of the two second bearing elements is sleeved on a corresponding one of two second fixing shafts, so that the second rocker arm rotates relative to the supporting base.

In some embodiments, the rocker device includes a circuit board, wherein at least one of two ends of the first rocker arm is provided with a first magnet, and the circuit board is provided with at least one first Hall sensor that is matched with the first magnet. At least one of two ends of the second rocker arm is provided with a second magnet, and the circuit board is provided with at least one second Hall sensor that is matched with the second magnet. Alternatively, at least one third magnet is disposed on a side surface of the second end away from the rocker, and the circuit board is provided with at least one three-dimensional Hall sensor that is matched with the third magnet.

BRIEF DESCRIPTION OF THE DRAWINGS

In order to more clearly illustrate the technical solutions in some embodiments of the present disclosure, hereinafter, a brief introduction will be given to the accompanying drawings that are used in the description of some embodiments. Obviously, the accompanying drawings in the description below are merely some embodiments of the present disclosure. For those of ordinary skill in the art, other accompanying drawings may be obtained based on these accompanying drawings without any creative efforts.

Figure 1:
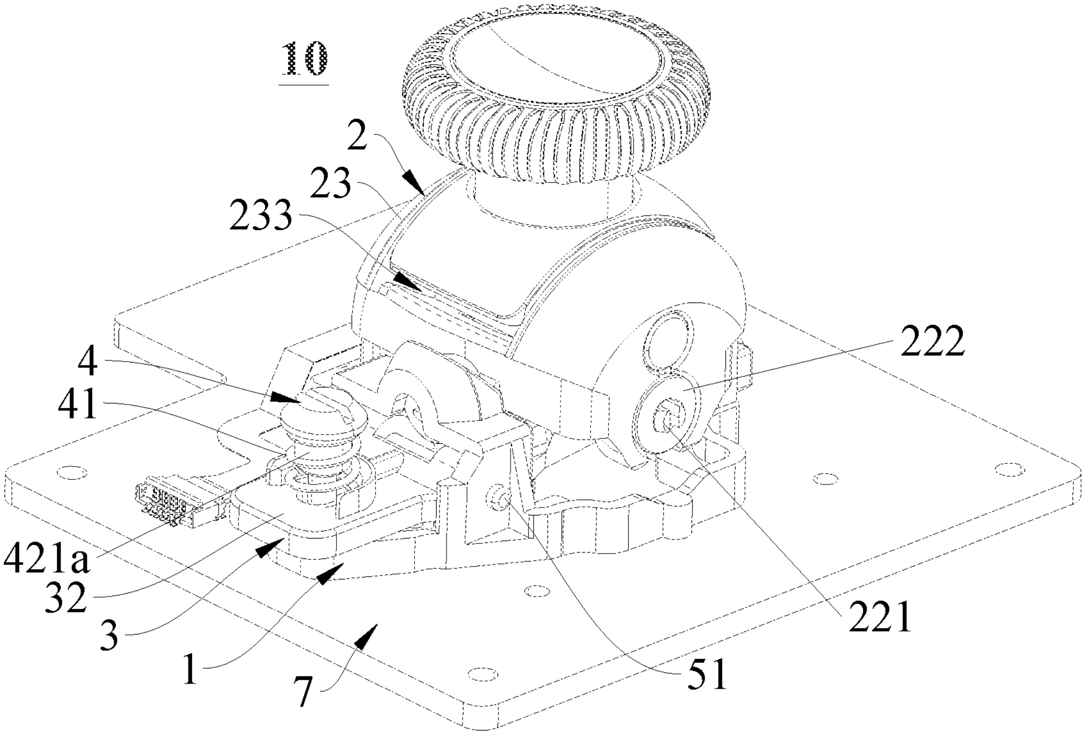
FIG. 1 is a structural schematic view of a rocker device in a first embodiment of the present disclosure.

Explanation of reference signs: 10: rocker device; 1: supporting base; 13: second hanging groove; 2: rocker arm assembly; 21: rocker; 211: pressing part; 2111: bottom wall; 2111*a*: inclined surface; 212: connecting part; 22: first rocker arm; 221: first fixing shaft; 222: first bearing element; 23: second rocker arm; 231: second fixing shaft; 232: second bearing element; 233: installing chamber; 3: deviating element; 31: first end; 32: second end; 321: limiting position column; 4: reset assembly; 41: elastic element; 42: adjusting assembly; 421*a*: first adjusting element; 422*a*: first connecting element; 421*b*: second adjusting element; 422*b*: pressing block; 4221*b*: first hanging groove; 423*b*: snap ring; 4231*b*: first snap ring; 4232*b*: second snap ring; 424*b*: second connecting element; 421*c*: third adjusting element; 4211*c*: abutting block; 4212*c*: guiding column; 422*c*: rotating cover; 4221*c*: track groove; 4222*c*: first bottom surface; 4223*c*: sloped surface; 4224*c*: driving part; 4225*c*, second bottom surface; 51: rotating shaft; 52: rotating shaft groove; 7: circuit board; 81: two-dimensional Hall assembly.

DETAILED DESCRIPTION

The technical solutions in some embodiments of the present disclosure may be clearly and completely described in conjunction with accompanying drawings in some embodiments of the present disclosure. Obviously, the described embodiments are only a part of the embodiments of the present disclosure, and not all embodiments. Based on the embodiments in the present disclosure, all other embodiments obtained by those of ordinary skill in the art without creative effort are within the scope of the present disclosure.

The reference to "embodiment" in the present disclosure means that, specific features, structures, or characteristics described in conjunction with some embodiments may be included in at least one embodiment of the present disclosure. This phrase appearing in various positions in the specification does not necessarily refer to the same embodiment, nor is it an independent or alternative embodiment that is mutually exclusive with other embodiments. Those of ordinary skill in the art explicitly and implicitly understand that the embodiments described in the present disclosure may be combined with other embodiments.

The present disclosure provides a rocker device to solve a technical problem that during the assembly process of the rocker device, it is necessary to ensure that a reset spring, a movable part, and a rocker are all coaxial to achieve the return of the rocker, resulting in high difficulty of assembling the rocker device. In addition, a technical problem that a friction force between the rocker and the movable part increases due to the reset spring being located below the rocker is also solved.

A rocker of a rocker device is a core element of a device, such as a game controller, a drone remote control, or the like. During rotating process, the rocker may provide real-time signals for the device such as the game controller or the drone remote control to control the movement of a game character or a drone device. The accuracy of the signals directly affects experiences of users, which is the core cardinality requirement of rocker device. Therefore, it is crucial for the rocker to accurately return to an original point every time.

A dead zone of the rocker is that the real-time signals of the rocker's action will not affect the game character or the drone in a predetermined range. When a restoring force provided by the reset spring located below the rocker reaches torque balance with a friction force of various elements inside the rocker, the rocker is stuck in a non-original point position. As the usage time increases, each element is worn, and the friction force between adjacent elements will increase, exceeding an initial dead zone value of the rocker. In this case, it is necessary to expand the rocker dead zone range to ensure the accuracy of rocker action, which leads to poor consistency in the dead zone. The poor consistency in the dead zone means increasing the ineffective operation of the rocker. That is, the users need to first operate the rocker to cross the expanded dead zone range of the rocker, and then the users may control the game character or the drone. Only crossing the initial dead zone of the rocker is ineffective for the game character or the drone. For a competitive game, the ineffective operation directly affects the experiences of the users. The larger the dead zone range of the rocker, the worse the usage experiences of the users.

A rocker device provided by the present disclosure may be explained in detail by combining the accompanying drawings and some embodiments.

Figure 2:
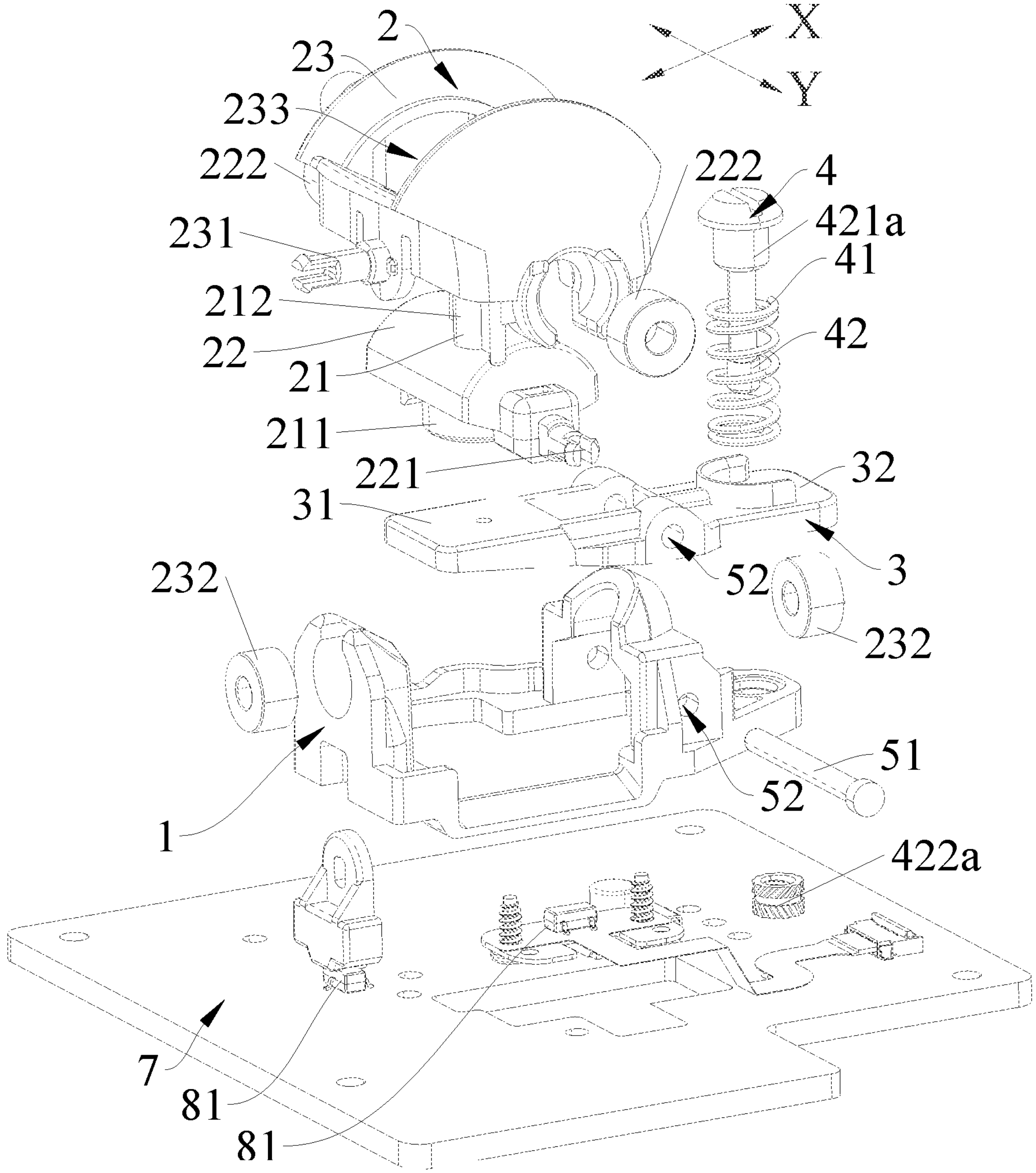
FIG. 2 is an exploded schematic view of the rocker device in the first embodiment of the present disclosure.
Figure 3:
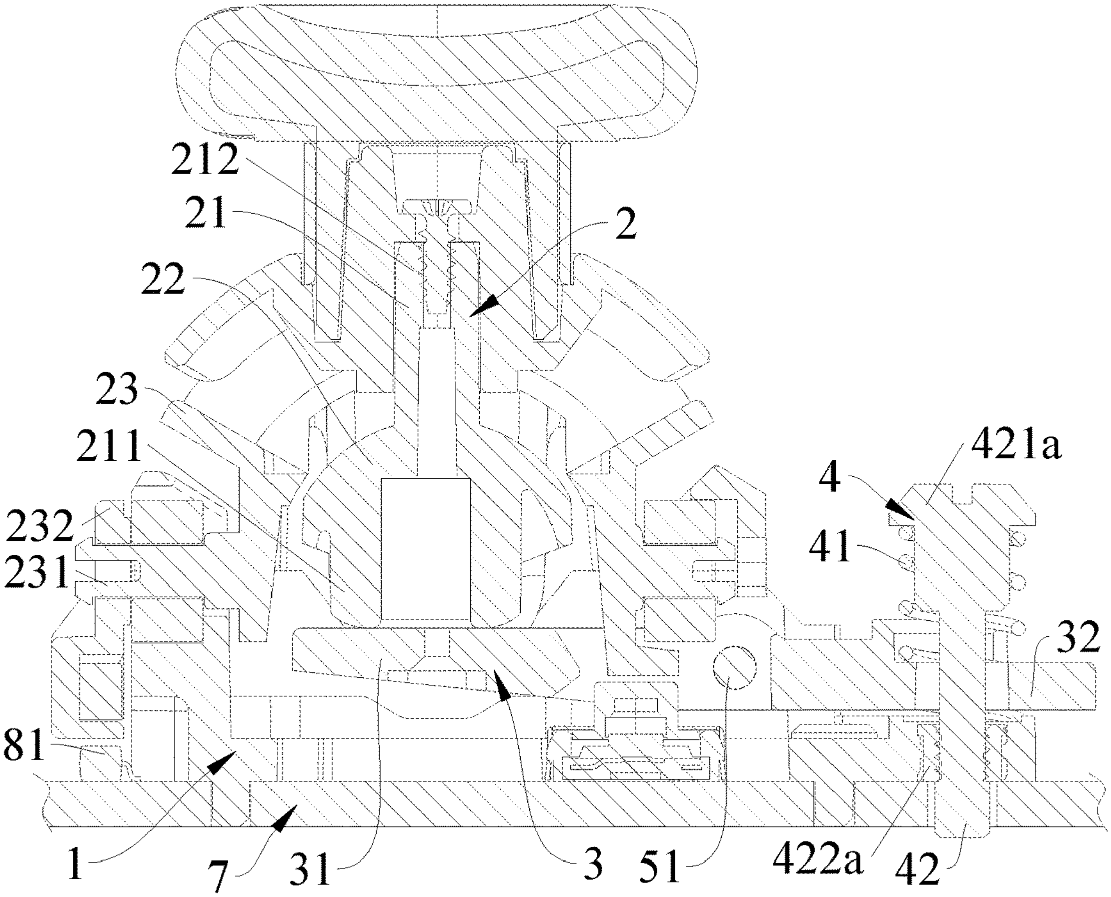
FIG. 3 is a cross-sectional schematic view of the rocker device in a first state in the first embodiment of the present disclosure.

Referring to FIG. 1, FIG. 2, and FIG. 3, FIG. 1 is a structural schematic view of a rocker device in a first embodiment of the present disclosure, FIG. 2 is an exploded schematic view of the rocker device in the first embodiment of the present disclosure, and FIG. 3 is a cross-sectional schematic view of the rocker device in a first state in the first embodiment of the present disclosure. The present disclosure provides a rocker device 10. The rocker device 10 includes a supporting base 1, a rocker 21, a deviating element 3, and a reset assembly 4. The supporting base 1 provides a certain amount of support for the entire rocker device 10. The rocker 21 includes a pressing part 211. The deviating element 3 includes a first end 31 and a second end 32 that are opposite to each other. The first end 31 is in contact with the pressing part 211. The pressing part 211 is always in contact with the first end 31, regardless of whether the rocker 21 is in a rotating or resetting state.

The reset assembly 4 is disposed on the second end 32. When the pressing part 211 acts on the first end 31, the second end 32 acts on the reset assembly 4, and a structure of the reset assembly 4 is changed and accumulates a certain amount of energy. When the pressing part 211 releases a force on the first end 31, and the second end 32 also releases a force on the reset assembly 4, the reset assembly 4 may release energy and restore its original state relying on its own structure, and the reset assembly 4 may drive the second end 32 to reset. The deviating element 3 is disposed on the supporting base 1 through a lever, and force conditions of the first end 31 and the second end 32 affect each other. The reset assembly 4 may have any structure, as long as the reset assembly 4 meets a reset function. A specific structure of the reset assembly 4 is not limited.

Figure 4:
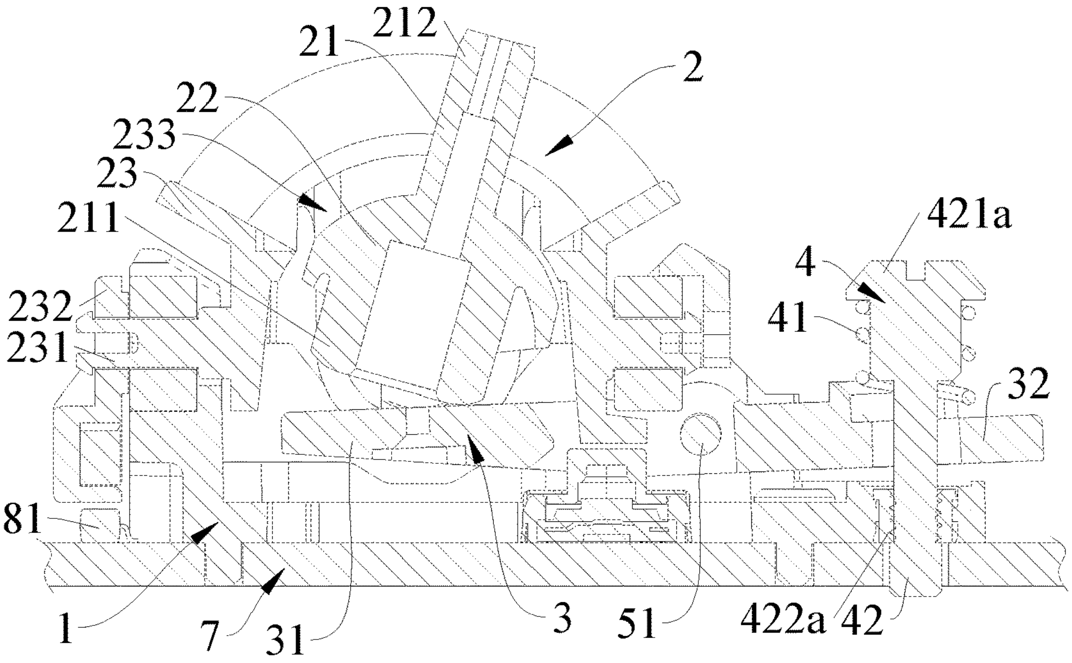
FIG. 4 is a cross-sectional schematic view of the rocker device in a second state in the first embodiment of the present disclosure.

Referring to FIG. 4, FIG. 4 is a cross-sectional schematic view of the rocker device in a second state in the first embodiment of the present disclosure. Combining FIGS. 1 to 3, when the pressing part 211 presses the first end 31 of the deviating element 3, the first end 31 bears the force to drive the second end 32 to move, causing the second end 32 of the deviating element 3 to deviate. During a deviation process of the second end 32, the second end 32 acts on the reset assembly 4, so that the structure of the reset assembly 4 is changed and certain capabilities are accumulated in the reset assembly 4. When the pressing part 211 releases the pressing on the first end 31, the second end 32 releases the force on the reset assembly 4. In this case, the reset assembly 4 returns to its original state and drives the second end 32 of the deviating element 3 to reset, thereby resetting the first end 31 and driving the rocker 21 to reset by the first end 31.

By the above mode, the reset assembly 4 is disposed on the second end 32 of the deviating element 3, instead of the first end 31 of the deviating element 3, to avoid coaxial setting of the rocker 21 and a reset mechanism, and to reduce the difficulty of assembling the rocker device 10. When the reset assembly 4 is defective, it is easy to disassemble and replace the reset assembly 4. In addition, the deviating element 3 is disposed on the supporting base 1 in a lever manner, the reset assembly 4 is disposed on the second end 32 of the deviating element 3, and the pressing part 211 of the rocker 21 is in direct contact with the first end 31 of the deviating element 3. Therefore, the deviating element 3 does not need to be coaxial with the reset mechanism, reducing a contact area between the deviating element 3 and the supporting base 1, thereby reducing a friction resistance between the deviating element 3 and the supporting base 1, improving the accuracy of operating the rocker 21, and improving the usage experience of the rocker device 10. Furthermore, it is no need to change the structure of rocker 21. Moreover, due to the lever arrangement of deviating element 3 and the non-coaxial arrangement of the reset mechanism and rocker 21, deviating element 3 may be supported by lightweight materials rather than high-strength metal materials, greatly reducing production costs.

The deviating element 3 is disposed on the supporting base 1 in the lever manner, and the force conditions of the first end 31 and the second end 32 affect each other. A specific structure of the deviating element 3 installed on the supporting base 1 is not limited, as long as the deviating element 3 may be deviated on the supporting base 1. In some embodiments, the deviating element 3 may be levered to move on the supporting base 1 through a ball head and ball socket structure, a shaft structure, or the like.

In some embodiments, the deviating element 3 is pivotally connected to the supporting base 1 through a rotating shaft 51. The rotating shaft 51 not only provides a certain support force for the installation of the deviating element 3 onto the supporting base 1, but also allow the deviating element 3 to rotate relative to the supporting base 1. The deviating element 3 and the supporting base 1 are pivoted through the rotating shaft 51, making the rotation of the deviating element 3 smoother relative to the supporting base 1. Therefore, the rocker 21 may be effortlessly pushed or reset, improving the usage experience. The friction force between the deviating element 3 and the supporting base 1 is also reduced, thereby reducing the possibility of expanding the dead zone of the rocker 21.

In some embodiments, a position of the rotating shaft 51 between the deviating element 3 and the supporting base 1 may be determined according to actual situation. The rotating shaft 51 may be disposed between an end of the first end 31 of the deviating element 3 and the supporting base 1. Alternatively, the rotating shaft 51 may be disposed between an end of the second end 32 of the deviating element 3 and the supporting base 1. Alternatively, the rotating shaft 51 may be disposed between the supporting base 1 and a middle position of the deviating element 3. Alternatively, the rotating shaft 51 may be disposed between the first end 31 and the middle position of the deviating element 3. Alternatively, the rotating shaft 51 may be disposed between the second end 32 and the middle position of the deviating element 3. A distance between the first end 31 and the middle position of the deviating element 3 is the same as a distance between the second end 32 and the middle position of the deviating element 3.

In some embodiments, the rotating shaft 51 is located between the first end 31 and the second end 32. The rotating shaft 51 is closer to the second end 32 than the first end 31. That is, the rotating shaft 51 is located between the second end 32 and the middle position of the deviating element 3. By limiting the position of the rotating shaft 51, the deviating element 3 smoothly rotates relative to the supporting base 1, and the rocker 21 is effortlessly pushed or reset, improving the usage experience of the rocker device 10.

In some embodiments, two sides of the deviating element 3 along an extending direction from the first end 31 to the second end 32 are connected to two sides of the supporting base 1 through the rotating shaft 51 and a rotating shaft groove 52. The rotating shaft 51 rotates in the rotating shaft groove 52, to rotate the deviating element 3 relative to the supporting base 1. The structure is simple and easy to be implemented.

In some embodiments, each of the two sides of the deviating element 3 along the extending direction is provided with the rotating shaft 51, each of the two sides of the supporting base 1 defines the rotating shaft groove 52, and the rotating shaft 51 rotates in the rotating shaft groove 52. In some embodiments, each of the two sides of the deviating element 3 along the extending direction defines the rotating shaft groove 52, each of the two sides of the supporting base 1 is provided with the rotating shaft 51, and the rotating shaft 51 rotates in the rotating shaft groove 52. In some embodiments, one of the two sides of the deviating element 3 along the extending direction defines the rotating shaft groove 52, one of the two sides of the supporting base 1 is provided with the rotating shaft 51, and the rotating shaft 51 rotates in the rotating shaft groove 52.

In an embodiment, one rotating shaft groove 52 is defined in the deviating element 3 along a direction perpendicular to the extending direction, and another rotating shaft groove 52 is defined in the two sides of the supporting base 1. The rotating shaft 51 passes through the above two rotating shaft grooves 52, to allow the deviating element 3 to rotate relative to the supporting base 1 through the rotating shaft 51. Compared with the above embodiments, in this embodiment, the deviating element 3 rotates more stably relative to the supporting base 1.

In some embodiments, two outer sides of the deviating element 3 along the extending direction are matched with two inner sides of the supporting base 1. In some embodiments, two inner sides of the deviating element 3 along the extending direction are matched with two outer sides of the supporting base 1, and the specific structures are not limited.

In some embodiments, a hard layer (not shown in the figures) is disposed on an end surface of the first end 31 facing towards the pressing part 211. The hard layer may enhance the hardness of the end surface of the first end 31 facing towards the pressing part 211, thereby reducing the wear of the pressing part 211 on the first end 31, improving the wear resistance of the first end 31, and improving the usage performance of the rocker device 10. In addition, the hard layer may form a mirror-like shape, which may reduce the friction force between the pressing part 211 and the first end 31, and reduce the possibility of expanding the dead zone of the rocker 21. The hard layer may be a metal layer or a metal alloy layer, etc., which is no limited.

Figure 5:
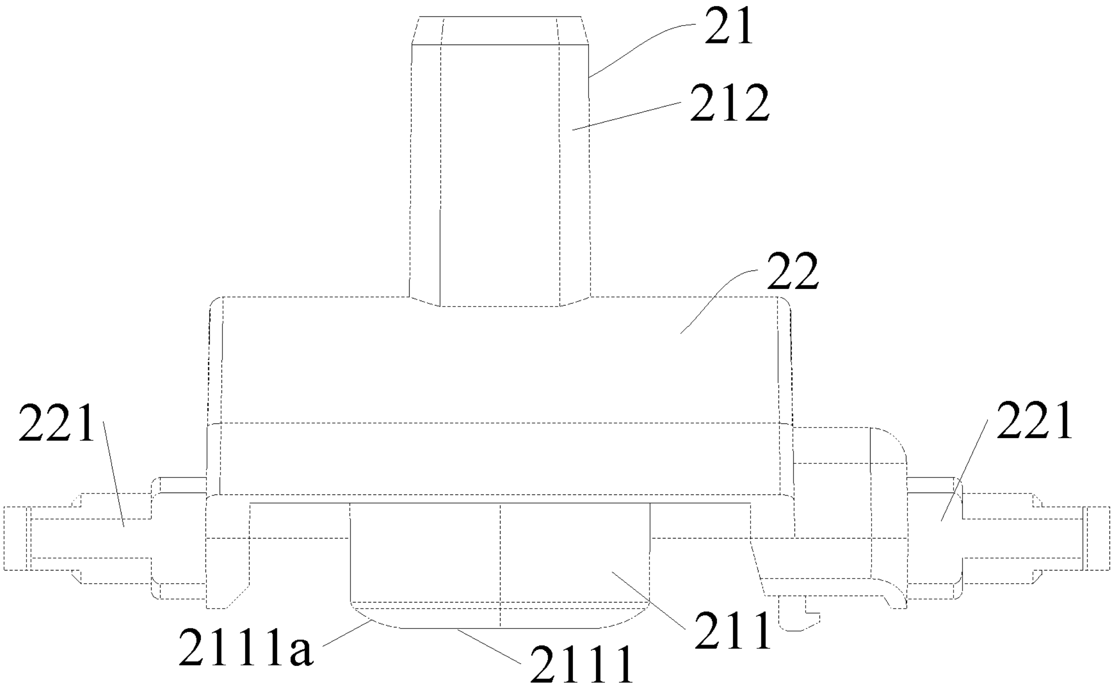
FIG. 5 is a structural schematic view of a rocker of the rocker device in the first embodiment of the present disclosure.
Figure 6:
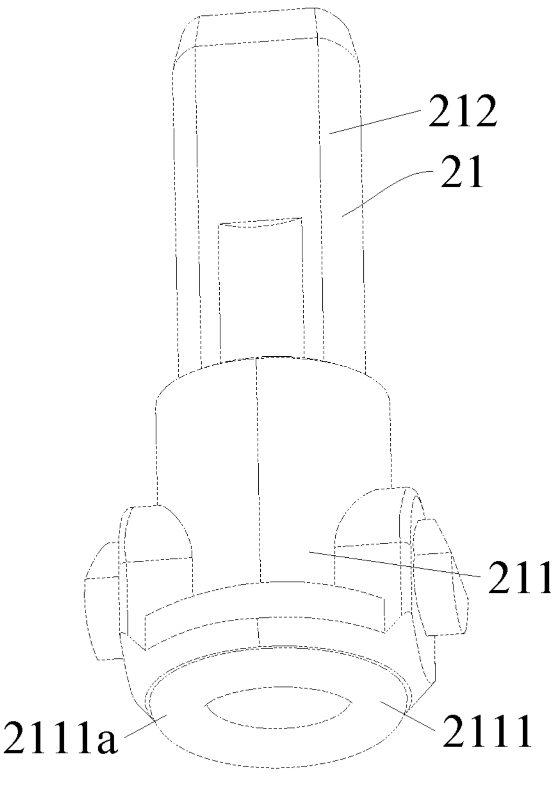
FIG. 6 is a structural schematic view of a rocker of a rocker device in a second embodiment of the present disclosure.

Referring to FIGS. 5 and 6, FIG. 5 is a structural schematic view of a rocker of the rocker device in the first embodiment of the present disclosure, and FIG. 6 is a structural schematic view of a rocker of a rocker device in a second embodiment of the present disclosure. Referring also to FIGS. 1 to 4, in some embodiments, the pressing part 211 includes a bottom wall 2111. An outer circumference of the bottom wall 2111 is provided with an inclined surface 2111*a*. When the rocker 21 rotates in different directions, the pressing part 211 presses the first end 31 in different directions. When the pressing part 211 tilts, the inclined surface 2111*a* is at least in line contact with the first end 31, increasing a contact area between the inclined surface 2111*a* and the first end 31, thereby enhancing the stability of the rocker 21 acting on the first end 31.

In some embodiments, the inclined surface 2111*a* is arc-shaped, which not only increases the contact area between the inclined surface 2111*a* and the first end 31, improves the stability of the rocker 21 acting on the first end 31, but also reduces the friction force between the inclined surface 2111*a* and the first end 31, thereby reducing the wear of the pressing part 211 on the first end 31.

In an existing rocker device, a rocker requires a certain amount of operating force to be pushed. The existing reset mechanism cannot be adjusted. Furthermore, due to the reset mechanism being located below the rocker, it is difficult to replace the reset mechanism, resulting in a single operating force of the rocker in the rocker device, which cannot meet different users' demands for operating force of the rocker. The size of operating force of the rocker directly affects the usage experience. The smaller the operating force, the easier the operation.

Therefore, by changing the structure of reset assembly 4 itself, different reset forces are formed, thereby achieving adjustable operating forces for the rocker 21. In addition, the reset assembly 4 is disposed on the second end 32 of the deviating element 3, which facilitates to adjusting the reset assembly 4 at any time, thereby further meeting different operating force demands of the rocker 21.

In some embodiments, the reset assembly 4 includes an elastic element 41 and an adjusting assembly 42. The elastic element 41 has a certain elastic force. The elastic element 41 is configured to reset the deviating element 3. The adjusting assembly 42 is configured to limit the elastic element 41. The adjusting assembly 42 limits the elastic element 41 to adjust different elastic forces of the elastic element 41, thereby allowing the operating forces of the rocker 21 to be adjustable, and improving the usage experience. The elastic element 41 may be a compression spring or a tension spring, etc., which is no limited. The adjusting assembly 42 may have any structure, as long as the forces of the elastic element 41 are adjustable, which is no limited.

In some embodiments, the adjusting assembly 42 is adjustable and fixed to the supporting base 1. The adjusting assembly 42 is disposed on corresponding positions of the supporting base 1 and the second end 32, to enhance the stability of the adjusting assembly 42 for adjusting the elastic force of the elastic element 41, thereby achieving various different implementation modes.

Referring also to FIGS. 1 to 4, in the first embodiment, the adjusting assembly 42 includes a first adjusting element 421*a*. The first adjusting element 421*a* passes through the second end 32, and the first adjusting element 421*a* is connected to the supporting base 1. The elastic element 41 is sleeved on the first adjusting element 421*a*. An end of the elastic element 41 is in contact with an end of the first adjusting element 421_a_ away from the second end 32. The other end of the elastic element 41 is in contact with a side of the second end 32 away from the supporting base 1. The two ends of the elastic element 41 are located between the first adjusting element 421_a_ and the second end 32. By changing a distance between the first adjusting element 421_a_ and the second end 32, the length of the elastic element 41 may be changed, resulting in different elastic forces of the reset assembly 4, thereby meeting the different operating force demands of different users for the rocker 21. The specific structure of the first adjusting assembly 421_a_ is not limited, as long as the first adjusting assembly 421_a_ may be adjusted. The elastic element 41 may be a compression spring.

In some embodiments, after the first adjusting element 421_a_ passes through the second end 32, the first adjusting element 421_a_ and the supporting base 1 are in a threaded connection. The first adjusting element 421_a_ rotates relative to the supporting base 1, which may change the length of the elastic element 41, making the elastic forces of the reset assembly 4 different, thereby meeting the different operating force demands of different users for the rocker 21. In addition, the first adjusting element 421_a_ and the supporting base 1 are in the threaded connection, so that the adjustment of the first adjusting element 421_a_ is simpler, and replacing and installing the first adjusting element 421_a_ is easier. The first adjusting element 421_a_ may be a fixed screw or a fixed screw rod.

When the first adjusting element 421_a_ rotates along a direction relative to the supporting base 1, the length of the elastic element 41 becomes longer, and the deformation of the elastic element 41 becomes smaller. In this case, the operating force of the rocker 21 reduces. When the first adjusting element 421_a_ rotates in another direction relative to the supporting base 1, the length of the elastic element 41 becomes shorter, and the deformation of the elastic element 41 becomes larger. In this case, the operating force of the rocker 21 increases. Therefore, by adjusting the length of the elastic element 41, different users' demands for different operating forces of rocker 21 are met.

In some embodiments, the adjusting assembly 42 includes a first connecting element 422_a_. The first connecting element 422_a_ is disposed in the supporting base 1. The first adjusting element 421_a_ and the first connecting element 422_a_ are in the threaded connection. By disposing the first connecting element 422_a_ in the supporting base 1, the first adjusting element 421_a_ and the first connecting element 422_a_ are in the threaded connection, to improve the adjustment stability of the first adjusting element 421_a_ and reduce the risk of the first adjusting element 421_a_ separating out of the supporting base 1.

The first connecting element 422_a_ may be embedded or clamped in the supporting base 1. An inner wall of the first connecting element 422_a_ is provided with internal threads (not shown in the figures). An outer wall of the first adjusting element 421_a_ is provided with external threads (not shown in the figures). The internal threads and external threads are connected through the threaded connections. The first connecting element 422_a_ may be a fixed nut. The cooperation of the fixed nut, the fixed screw, and the compression spring allow the reset assembly 4 to have different elastic forces, which not only simplifies the operation, but also makes the structure simple and easy to replace, and the cost is also reduced.

Figure 7:
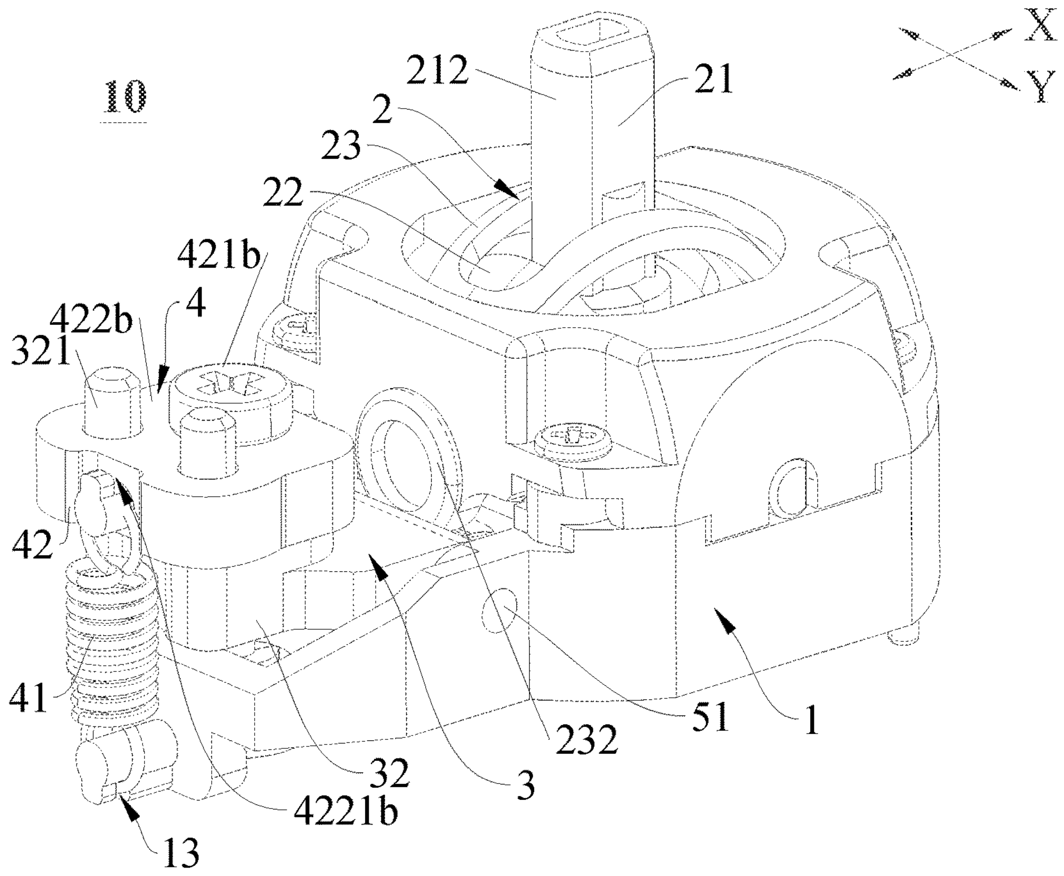
FIG. 7 is a structural schematic view of a rocker device in the second embodiment of the present disclosure.
Figure 8:
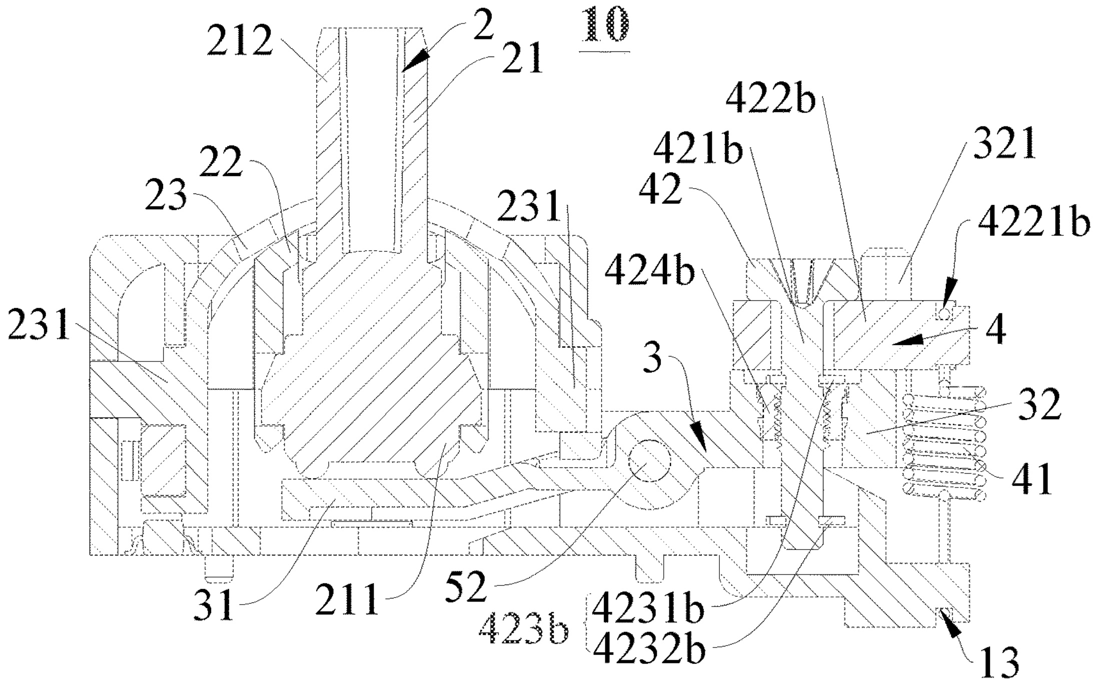
FIG. 8 is a cross-sectional schematic view of the rocker device in the second embodiment of the present disclosure.
Figure 9:
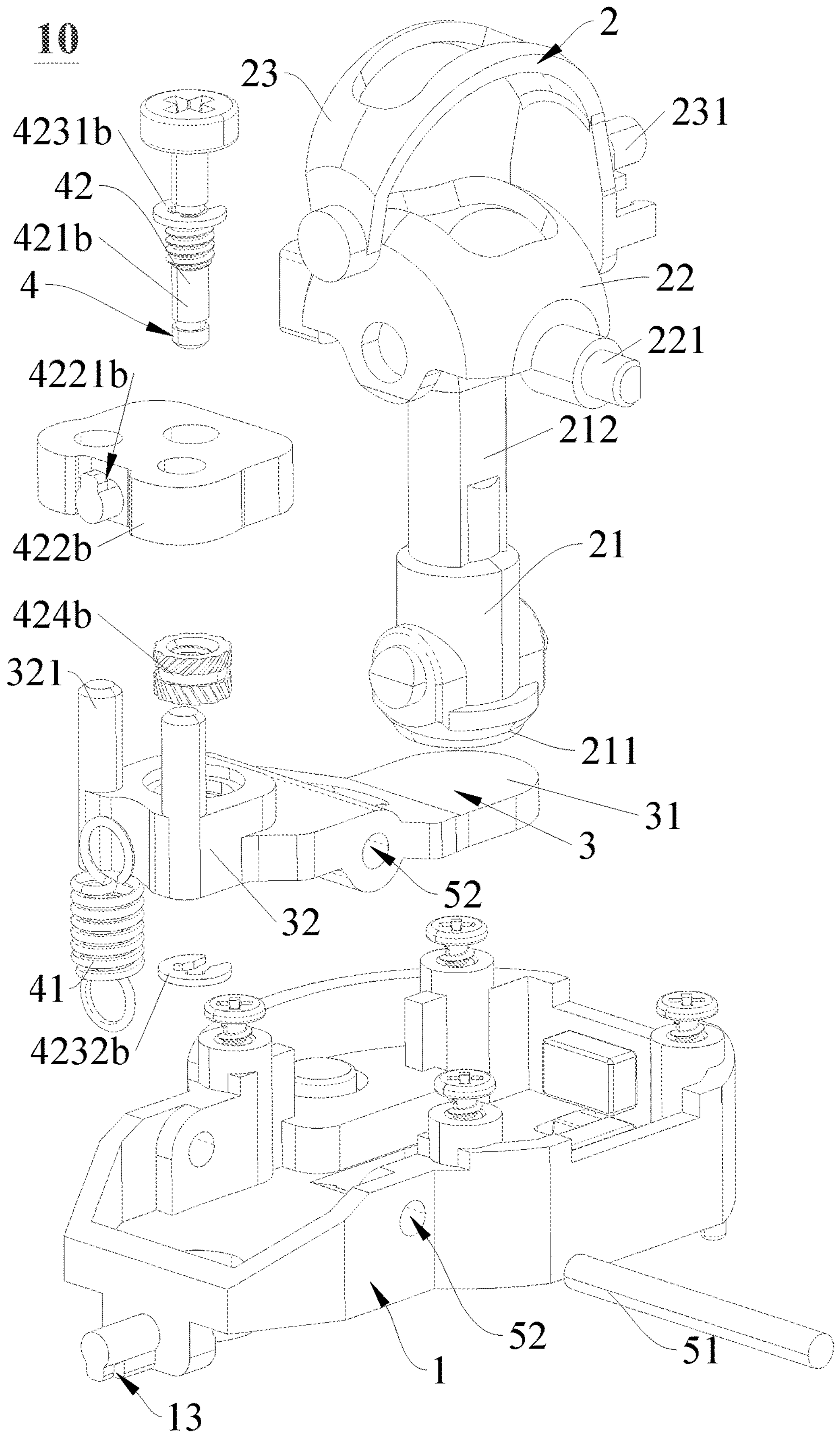
FIG. 9 is an exploded schematic view of the rocker device in the second embodiment of the present disclosure.

Referring to FIGS. 7, 8, and 9, FIG. 7 is a structural schematic view of a rocker device in the second embodiment of the present disclosure, FIG. 8 is a cross-sectional schematic view of the rocker device in the second embodiment of the present disclosure, and FIG. 9 is an exploded schematic view of the rocker device in the second embodiment of the present disclosure. In the second embodiment, the adjusting assembly 42 includes a second adjusting element 421_b_ and a pressing block 422_b_. The second adjusting element 421_b_ passes through one end of the pressing block 422_b_ and is connected to the second end 32. One end of the elastic element 41 is connected to the other end of the pressing block 422_b_. The other end of the elastic element 41 is connected to the supporting base 1. Since the second adjusting element 421_b_ is connected to the second end 32, by adjusting a height of the second adjusting element 421_b_ relative to the second end 32 or the pressing block 422_b_, the tightness of the pressing block 422_b_ may be adjusted, thereby changing the length of the elastic element 41, resulting in different elastic forces of the reset assembly 4, and meeting the different operating force demands of different users for the rocker 21.

In some embodiments, adjusting is performed by the second adjusting element 421_b_, when a distance between the pressing block 422_b_ and the supporting base 1 increases, a tensile force of the elastic element 41 increases, causing the elastic force of the reset assembly 4 to increase, thereby increasing the operating force of the rocker 21. When the distance between the pressing block 422_b_ and the supporting base 1 reduces, the tensile force of the elastic element 41 reduces, causing the elastic force of the reset assembly 4 to decrease, thereby reducing the operating force of the rocker 21. By adjusting a relative distance between the pressing block 422_b_ and the supporting base 1 through the second adjusting element 421_b_, the elastic force of the elastic element 41 may be changed, thereby achieving different user demands for different operating forces of the rocker 21. The second adjusting assembly 421_b_ may be the fixed screw, the fixed screw rod, etc., which is not limited. The elastic element 41 may be a tension spring.

In some embodiments, the second adjusting element 421_b_ is threaded to the second end 32. The second adjusting element 421_b_ may be conveniently adjusted into the second end 32 through the threads, and a distance between the pressing block 422_b_ and the second end 32 may be changed, thereby changing the elastic force of the elastic element 41, resulting in different elastic forces of the reset assembly 4, and meeting the different operating force demands of different users for the rocker 21. In addition, the second adjusting element 421_b_ and the second end 32 are in the threaded connection, so that the adjustment of the second adjusting element 421_b_ is simpler, and replacing and installing the second adjusting element 421_b_ is easier.

In some embodiments, the pressing block 422_b_ is disposed on the side of the second end 32 away from the supporting base 1. Alternatively, the pressing block 422_b_ is disposed between the second end 32 and the supporting base 1. Therefore, the pressing block 422_b_ may be flexibly disposed according to the actual situation, making a structural design of the rocker device 10 more flexible. Furthermore, due to different positions of the pressing block 422_b_, the distances between the pressing block 422_b_ and the supporting base 1 are also different, which may cause different degrees of elastic deformation of the elastic element 41 and increase diversity of operating forces of the rocker device 10.

The position of pressing block 422_b_ may be determined according to the actual situation. In some embodiments, the pressing block 422_b_ is disposed on the side of the second end 32 away from the supporting base 1. The distance between the pressing block 422*b* and the supporting base 1 is relatively large, which increases the elastic deformation of the elastic element 41 and increases the elastic force of the elastic element 41. In some embodiments, the pressing block 422*b* is disposed between the second end 32 and the supporting base 1. The distance between the pressing block 422*b* and the supporting base 1 is relatively less, which may reduce the elastic deformation of the elastic element 41 and make the elastic force of the elastic element 41 smaller.

In some embodiments, the reset assembly 4 includes a second connecting element 424*b*. The second connecting element 424*b* is disposed in the second end 32. The second adjusting element 421*b* is threaded to the second connecting element 424*b*. The second connecting element 424*b* is disposed in the second end 32, the second adjusting element 421*b* and the second connecting element 424*b* are in the threaded connection, to improve the adjustment stability of the second adjusting element 421*b* and reduce the risk of the second adjusting element 421*b* separating out of the second end 32.

The second connecting element 424*b* may be embedded or clamped in the second end 32. An inner wall of the second connecting element 424*b* is provided with the internal threads (not shown in the figures). An outer wall of the second adjusting element 421*b* is provided with the external threads (not shown in the figures). The internal threads and the external threads are in the threaded connection. The second connecting element 424*b* may be a fixed nut. The cooperation of the fixed nut, the fixed screw, and the tension spring allow the reset assembly 4 to have different elastic forces, which not only simplifies the operation, but also makes the structure simple and easy to replace, and the cost is also reduced.

In some embodiments, the second adjusting element 421*b* is provided with at least one snap ring 423*b*. The at least one snap ring 423*b* is located between the pressing block 422*b* and the second end 32. The snap ring 423*b* limits the pressing block 422*b* along an axial direction of the second adjusting element 421*b*. When the second adjusting element 421*b* is driven by the second end 32 to move, the second adjusting element 421*b* is limited by the snap ring 423*b* to drive the pressing block 422*b* to move. Therefore, the pressing block 422*b* stably moves with the second adjusting element 421*b*, and then the pressing block 422*b* drives the elastic element 41 to elastically deform.

The number of snap rings 423*b* may be one, two, three, or more, which is no limited. In some embodiments, the number of snap rings 423*b* is two. The snap ring 423*b* may be integrally formed on the second adjusting element 421*b* or sleeved on the second adjusting element 421*b*, which is no limited.

In some embodiments, the second adjusting element 421*b* passes through the second end 32. The second adjusting element 421*b* is sleeved with a first snap ring 4231*b* and a second snap ring 4232*b*. The first snap ring 4231*b* is located between the pressing block 422*b* and the second end 32. The second snap ring 4232*b* is located on an end of the second adjusting element 421*b* away from the pressing block 422*b*. When the second adjusting element 421*b* is threaded to the second end 32, the first snap ring 4231*b* moves with the movement of the second adjusting element 421*b*. The first snap ring 4231*b* has a limiting effect on the pressing block 422*b*. The pressing block 422*b* moves with the movement of the second adjusting element 421*b* due to the limit. The second snap ring 4232*b* also moves with the movement of the second adjusting element 421*b*. When the second snap ring 4232*b* moves to a side where the second end 32 is away from the pressing block 422*b*, a limit is generated between the second snap ring 4232*b* and the side where the second end 32 is away from the pressing block 422*b*. The second adjusting element 421*b* cannot continue to be adjusted along a direction from the second snap ring 4232*b* to the first snap ring 4231*b*.

By the above mode, the pressing block 422*b* may stably move with the movement of the second end 32, driving the elastic element 41 to elastically deform, and changing the operating force required to operate the rocker device 10. In addition, since the second snap ring 4232*b* may generate a limit with the second end 32, when adjusting along the direction from the second snap ring 4232*b* to the first snap ring 4231*b*, the second adjusting element 421*b* may have a maximum adjustment distance and may transmit force feedback to the users. Therefore, the probability of structural damage caused by excessive adjustment of the rocker device 10 may be reduced.

In some embodiments, a distance between the first snap ring 4231*b* and the second snap ring 4232*b* is greater than a thickness of the second end 32. Therefore, the adjustment distance of the second adjusting element 421*b* may be the difference between the distance from the first snap ring 4231*b* to the second snap ring 4232*b* and the thickness of the second end 32, thereby facilitating the elastic deformation of the elastic element 41 by adjusting the position of the second adjusting element 421*b*.

In some embodiments, the second end 32 is provided with a limiting position column 321. The limiting position column 321 is parallel to an extending direction of the second adjusting element 421*b*. The limiting position column 321 passes through the pressing block 422*b*. By disposing the limiting position column 321, the second adjusting element 421*b* may be guided by the limiting position column 321 when the second adjusting element 421*b* is adjusted on the second end 32. The second adjusting element 421*b* may be stably and evenly adjusted on the second end 32, making the operation force required for adjusting the rocker device 10 more continuous and stable.

In some embodiments, a first hanging groove 4221*b* is defined in an end of the pressing block 422*b* away from the second adjusting element 421*b*. A second hanging groove 13 is defined in the supporting base 1. One end of the elastic element 41 is hung in the first hanging groove 4221*b*, and the other end of the elastic element 41 is hung in the second hanging groove 13. By the above settings, the elastic element 41 may be installed simply by hanging. It is easy to replace and maintain the elastic element 41.

Figure 10:
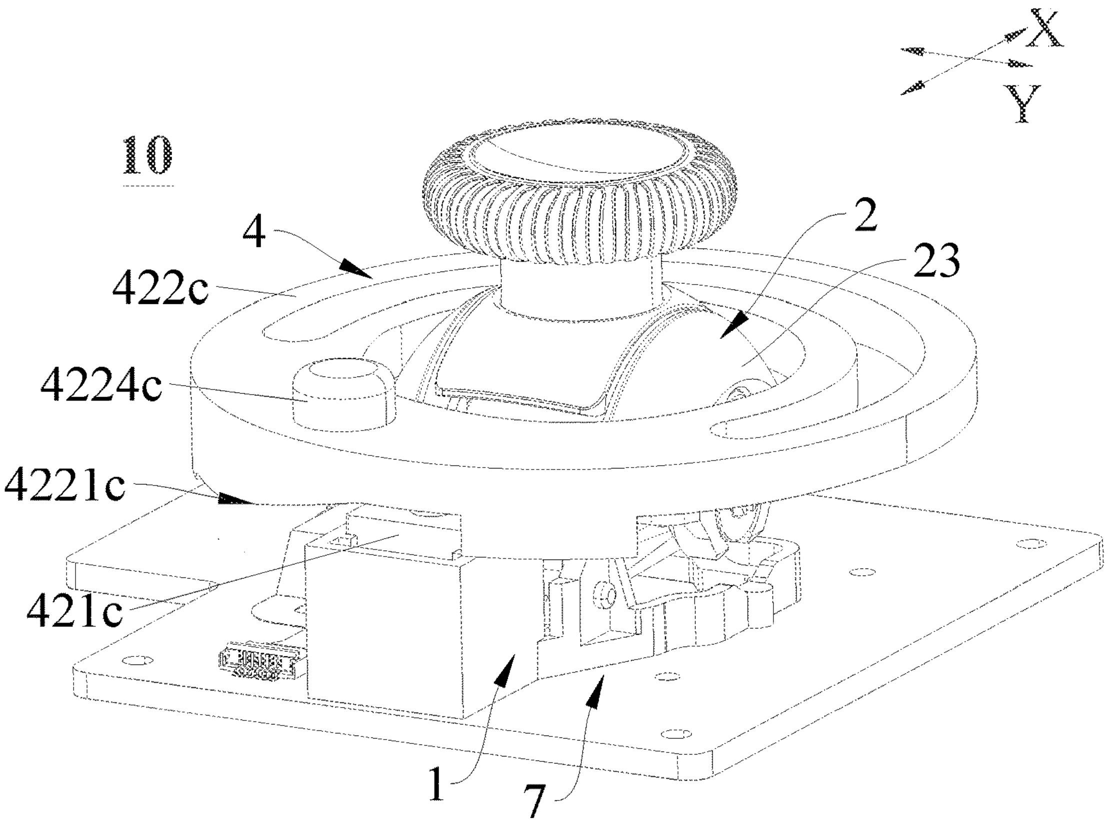
FIG. 10 is a structural schematic view of a rocker device in a third embodiment of the present disclosure.
Figure 11:
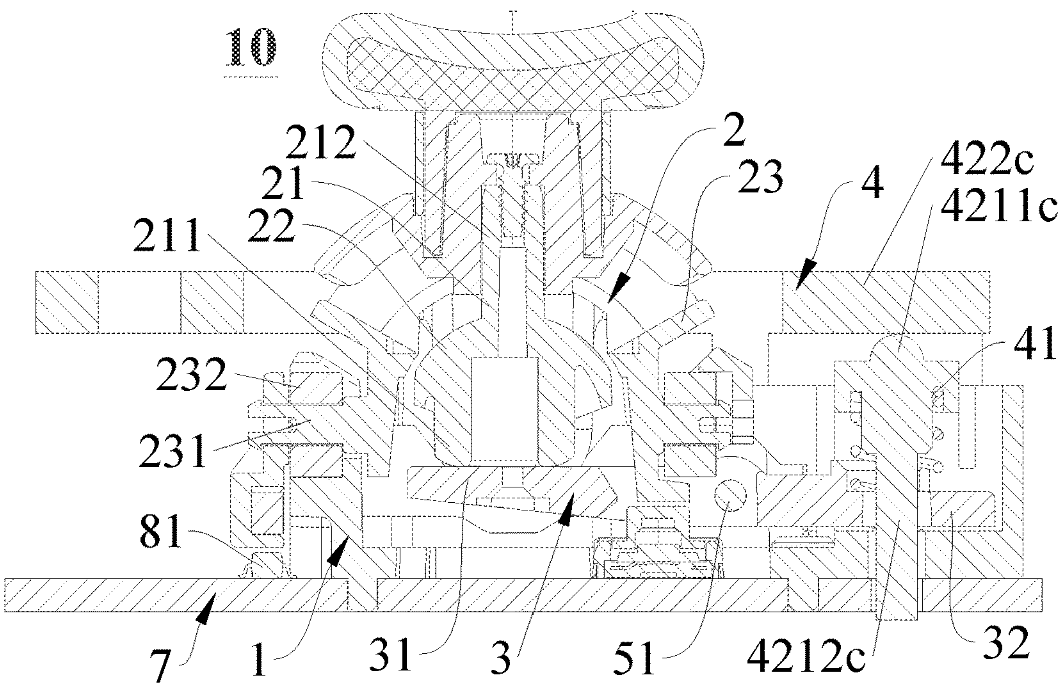
FIG. 11 is a cross-sectional schematic view of the rocker device in the third embodiment of the present disclosure.
Figure 12:
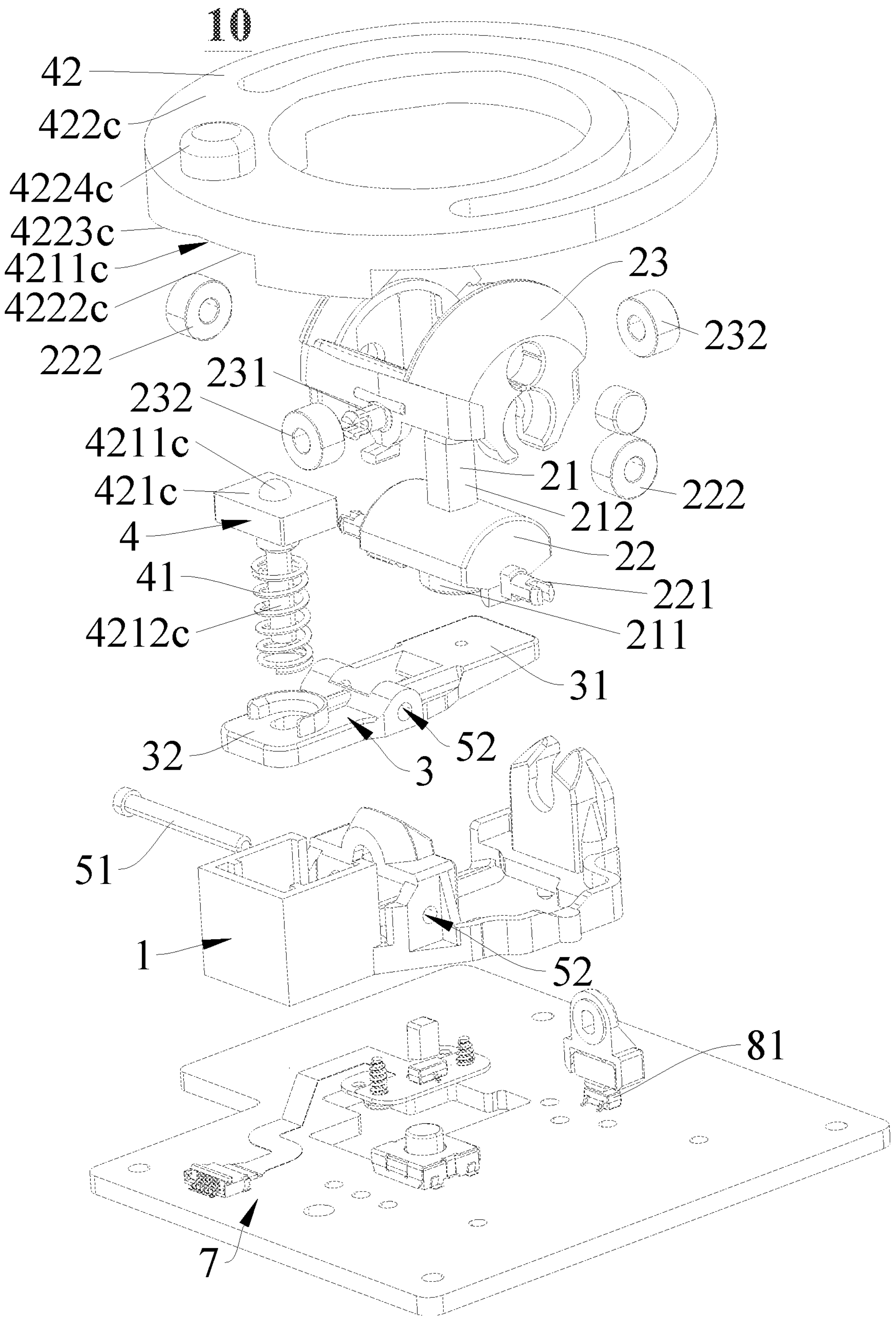
FIG. 12 is an exploded schematic view of the rocker device in the third embodiment of the present disclosure.

Referring to FIGS. 10, 11, and 12, FIG. 10 is a structural schematic view of a rocker device in a third embodiment of the present disclosure, FIG. 11 is a cross-sectional schematic view of the rocker device in the third embodiment of the present disclosure, and FIG. 12 is an exploded schematic view of the rocker device in the third embodiment of the present disclosure. In the third embodiment, the adjusting assembly 42 includes a third adjusting element 421*c* and a driving element (not shown in the figures). The third adjusting element 421*c* is spaced apart from the second end 32. The elastic element 41 is disposed between the third adjusting element 421*c* and the second end 32. One end of the elastic element 41 is connected to a side of the third adjusting element 421*c* away from the second end 32. The other end of the elastic element 41 is connected to a side of the second end 32 facing towards the third adjusting element 421*c*. The driving element is disposed on a side of the third adjusting element 421*c* away from the elastic element 41.

The driving element may drive the third adjusting element 421*c* to move close to or away from the second end 32, for changing the elastic force of the elastic element 41.

The motion mode of driving the third adjusting element 421*c* close to or away from the second end 32 may be set according to the actual situation. In some embodiments, the driving element is in contact with the third adjusting element 421*c*. The driving element pushes the third adjusting element 421*c* to move towards the second end 32. In some embodiments, the driving element is provided with a first magnetic element (not shown in the figures). The third adjusting element 421*c* is provided with a second magnetic element (not shown in the figures). The magnetic poles of the first magnetic element and the second magnetic element are mutually repelled. The driving element moves towards the second end 32, correspondingly causing the first magnetic element to move and change a position of the first magnetic element. The movement of the first magnetic element may increase a repulsive force on the second magnetic element, thereby causing the third adjusting element 421*c* to move towards the second end 32.

When the third adjusting element 421*c* moves close to the second end 32, a distance between the third adjusting element 421*c* and the second end 32 reduces, the degree of elastic deformation of elastic element 41 increases, and the elastic force applied by the elastic element 41 to the second end 32 increases. When the third adjusting element 421*c* moves away from the second end 32, the distance between the third adjusting element 421*c* and the second end 32 increases, the elastic deformation of elastic element 41 reduces, and the elastic force applied by the elastic element 41 to the second end 32 reduces.

Compared with existing technologies, the driving element drives the third adjusting element 421*c* close to or away from the second end 32, changing the distance between the third adjusting element 421*c* and the second end 32, causing the degree of elastic deformation of the elastic element 41 to be changed. Therefore, the reset assembly 4 has different elastic forces, thereby meeting the different operating force demands of different users for the rocker 21.

A connection mode between the elastic element 41 and the third adjusting element 421*c*, and a connection mode between the elastic element 41 and the second end 32 may be set according to the actual situation, such as butting, welding connection, bonding connection, etc., which is not limited.

Figure 13:
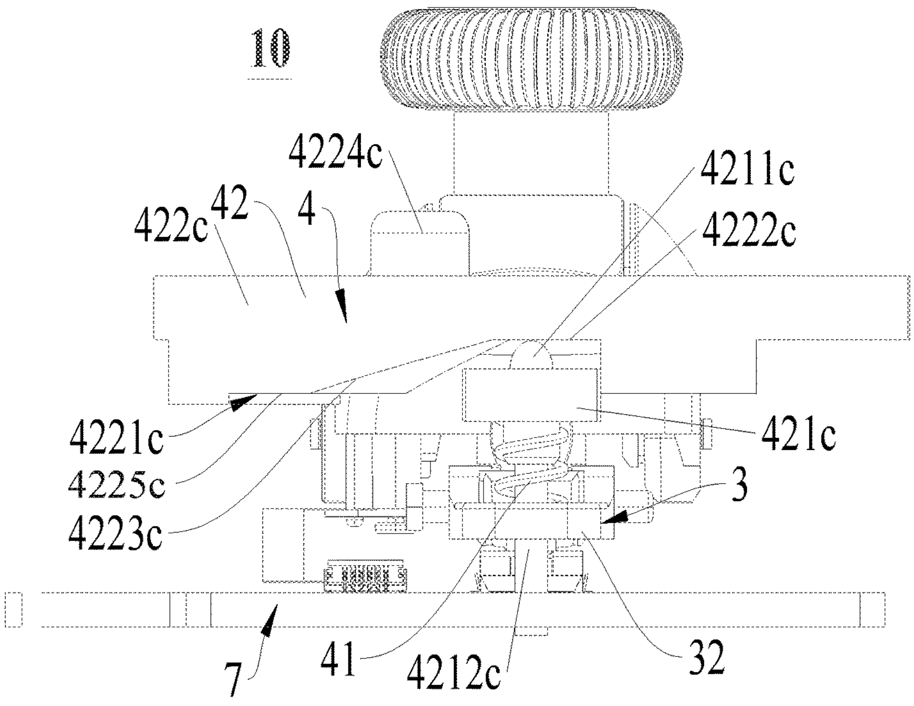
FIG. 13 is a side view of the rocker device in the third embodiment of the present disclosure.
Figure 14:
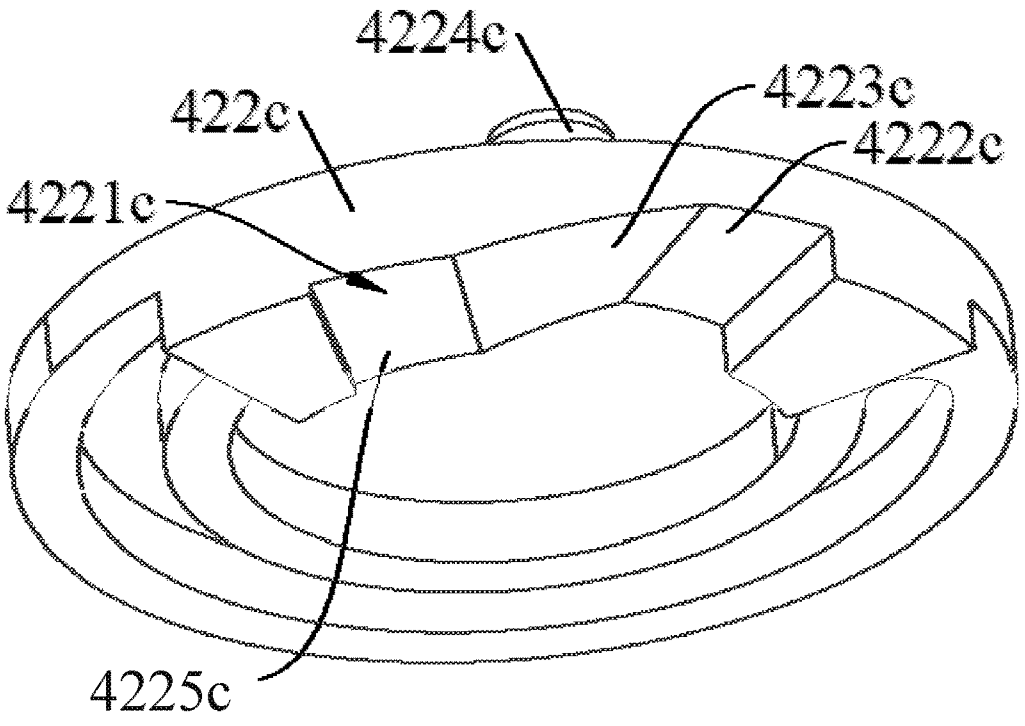
FIG. 14 is a structural schematic view of a rotating cover of the rocker device in the third embodiment of the present disclosure.

Referring to FIGS. 13 and 14, FIG. 13 is a side view of the rocker device in the third embodiment of the present disclosure, and FIG. 14 is a structural schematic view of a rotating cover of the rocker device in the third embodiment of the present disclosure. Combining FIGS. 10, 11, and 12, in some embodiments, the driving element includes a rotating cover 422*c*. The rotating cover 422*c* may rotate relative to the third adjusting element 421*c*. The elastic force of the elastic element 41 may be changed by the third adjusting element 421*c* being close to or away from the second end 32. When the rotating cover 422*c* rotates along a direction, the rotating cover 422*c* acts on the third adjusting element 421*c*, the third adjusting element 421*c* moves towards the second end 32, shortening the distance between the third adjusting element 421*c* and the second end 32. In this case, the length of the elastic element 41 reduces, the degree of elastic deformation of the elastic element 41 increases, and the elastic force of the elastic element 41 increases. When the rotating cover 422*c* rotates along another direction, the rotating cover 422*c* acts on the third adjusting element 421*c*, the third adjusting element 421*c* moves away from the second end 32, increasing the distance between the third adjusting element 421*c* and the second end 32. In this case, the length of the elastic element 41 increases, the degree of elastic deformation of the elastic element 41 reduces, and the elastic force of the elastic element 41 reduces.

By the above settings, the rotating cover 422*c* rotates to drive the third adjusting element 421*c* close to or away from the second end 32, causing the distance between the third adjusting element 421*c* and the second end 32 to be changed, and facilitating the adjustment of the elastic force of the elastic element 41. Therefore, the reset assembly 4 has different elastic forces, thereby meeting the different operating force demands of different users for the rocker 21.

In some embodiments, a track groove 4221*c* is defined in a side of the rotating cover 422*c* facing towards the third adjusting element 421*c*. The third adjusting element 421*c* may slide in the track groove 4221*c*. The third adjusting element 421*c* may abut against the track groove 4221*c*.

In some embodiments, when the third adjusting element 421*c* abuts against a first position (not shown in the figures) of the track groove 4221*c*, the track groove 4221*c* generates a first force on the third adjusting element 421*c*. When the rotating cover 422*c* rotates, the track groove 4221*c* moves relative to the third adjusting element 421*c*. When the third adjusting element 421*c* abuts against a second position (not shown in the figures) of the track groove 4221*c*, the track groove 4221*c* generates a second force on the third adjusting element 421*c*. The first force and the second force are different. By rotating the rotating cover 422*c*, the third adjusting element 421*c* abuts against different positions of the track groove 4221*c*. Therefore, the distance between the third adjusting element 421*c* and the second end 32 may be changed, thereby changing the elastic force of the elastic element 41, resulting in different elastic forces of the reset assembly 4, and meeting the different operating force demands of different users for the rocker 21.

The cooperation of the track groove 4221*c* and the third adjusting element 421*c* through the above settings, may change the elastic force of the elastic element 41. The structure is simple. It is easy to implement, replace and maintain.

A shape of the track groove 4221*c* may be set according to the actual situation. In some embodiments, the rotating cover 422*c* rotates clockwise, and a vertical distance between the track groove 4221*c* and a side surface of the second end 32 facing towards the rotating cover 422*c* gradually reduces. In some embodiments, the rotating cover 422*c* rotates counterclockwise, and the vertical distance between the track groove 4221*c* and the side surface of the second end 32 facing towards the rotating cover 422*c* gradually increases.

In some embodiments, the track groove 4221*c* includes multiple bottom surfaces 4222*c*, 4225*c* and multiple sloped surfaces 4223*c*. The bottom surfaces 4222*c*, 4225*c* and the sloped surfaces 4223*c* are alternately connected. The sloped surface 4223*c* is sloped along a rotating direction of the rotating cover 422*c*.

In some embodiments, the sloped surface 4223*c* is sloped towards an elastic direction of the elastic element 41. The bottom surface 4222*c*, 4225*c* is perpendicular to the elastic direction of elastic element 41. The third adjusting element 421*c* may abut against the sloped surface 4223*c* or the bottom surface 4222*c*, 4225*c*. When the third adjusting element 421*c* abuts against the sloped surface 4223*c*, the sloped surface 4223*c* forms a guiding sliding effect on the third adjusting element 421*c*, and the force of the rotating cover 422*c* on the third adjusting element 421*c* is changed with a sliding of the third adjusting element 421*c*. When the third adjusting element 421*c* abuts against the bottom surface 4222*c*, 4225*c*, the force of the rotating cover 422*c* on the third adjusting element 421*c* is not changed with the sliding of the third adjusting element 421*c*.

By the above settings, the rotating cover 422*c* changes the force on the third adjusting element 421*c* through the sloped surface 4223*c*, thus a height of the third adjusting element 421*c* close to or away from the second end 32 is changed. When a height position of the third adjusting element 421*c* needs to remain unchanged, the rotating cover 422*c* may allow the third adjusting element 421*c* to abut against the bottom surface 4222*c*, 4225*c*, and the third adjusting element 421*c* does not slide due to the elastic force of the elastic element 41. The third adjusting element 421*c* may remain stable. Therefore, the rotating cover 422*c* may adjust or maintain the distance between the third adjusting element 421*c* and the second end 32, which facilitates to set the elastic force of the elastic element 41 and flexibly adjust the operating force of the rocker device 10.

The number and distribution of the bottom surface 4222*c*, 4225*c* and the sloped surface 4223*c* may be set according to actual situations, which is not limited. The number of the bottom surface 4222*c*, 4225*c* may be two, three, four, or more. The number of the sloped surface 4223*c* may be one, two, three, or more. In some embodiments, the track groove 4221*c* includes a first bottom surface 4222*c*, a second bottom surface 4225*c*, and the sloped surface 4223*c*. Along a direction from the rotating cover 422*c* to the second end 32, a distance from the first bottom surface 4222*c* to the second end 32 is greater than a distance from the second bottom surface 4225*c* to the second end 32. One end of the sloped surface 4223*c* is connected to the first bottom surface 4222*c*, and the other end of the sloped surface 4223*c* a is connected to the second bottom surface 4225*c*.

In some embodiments, an abutting block 4211*c* is disposed on a side surface of the third adjusting element 421*c* facing towards the rotating cover 422*c*. The rotating cover 422*c* rotates relative to the abutting block 4211*c*. Thus, the third adjusting element 421*c* may smoothly abut against and slide onto the rotating cover 422*c*. It is easy for the rotating cover 422*c* to drive the third adjusting element 421*c* to move close to or away from the second end 32, improving the usage experience of the rocker device 10.

A material of the abutting block 4211*c* may be different from or the same as a material of the third adjusting element 421*c*, which is not limited. In some embodiments, the material of the abutting block 4211*c* is more wear-resistant than the material of the third adjusting element 421*c*, and the specific material is not limited. A shape of the abutting block 4211*c* may be set according to the actual situation.

In some embodiments, the abutting block 4211*c* is hemispherical, which facilitates the rotating cover 422*c* to rotate, thereby reducing the frictional resistance and improving the usage experience of the rocker device 10. In some embodiments, the abutting block 4211*c* is rectangular, and the connection between the abutting block 4211*c* and the track groove 4221*c* is more stable. In some embodiments, the abutting block 4211*c* may also be other shapes, which is not limited.

In some embodiments, the third adjusting element 421*c* includes a guiding element (not shown in the figures). Multiple guiding elements pass through the second end 32. The guiding element may play a guiding role. When the driving element drives the third adjusting element 421*c* to move towards the second end 32, the guiding element limits a compression direction of the elastic element 41, making the elastic force of the elastic element 41 more stable, thereby improving the stability of the operating force of the rocker device 10.

The guiding element may have any structure, as long as the guiding element has a guiding function, and the specific structure is not limited. In some embodiments, the third adjusting element 421*c* includes a guiding column 4212*c*, and the guiding column 4212*c* passes through the second end 32. The elastic element 41 is sleeved on the guiding column 4212*c*. When the driving element drives the guiding column 4212*c* to pass through the second end 32, the guiding column 4212*c* compresses the elastic element 41 and changes the elastic force of the elastic element 41. By disposing the guiding column 4212*c*, the elastic force of the elastic element 41 is more stable, thereby improving the stability of the operating force of the rocker device 10.

In some embodiments, the third adjusting element 421*c* includes a guiding frame (not shown in the figures). The guiding frame passes through the second end 32. The elastic element 41 is located in the guiding frame. When the driving element drives the guiding frame to pass through the second end 32, the guiding frame compresses the elastic element 41, to change the elastic force of the elastic element 41. By disposing the guiding frame, the elastic force of elastic element 41 is more stable, thereby improving the stability of the operating force of the rocker device 10.

Therefore, the guiding column 4212*c* or the guiding frame may play a guiding role, ensuring that the elastic force of the elastic element 41 does not deviate, and improving the stability of the operating force of the rocker device 10. The abutting block 4211*c* may be disposed on a side surface of the guiding column 4212*c* away from the second end 32. Alternatively, the abutting block 4211*c* may be located on a side surface of the guiding frame away from the second end 32.

In some embodiments, a driving part 4224*c* is disposed on a side surface of the driving element away from the third adjusting element 421*c*. The driving part 4224*c* drives the driving element to move, so that the driving element acts on the third adjusting element 421*c*. The specific structure of the driving part 4224*c* is not limited, as long as the driving part 4224*c* may drive the driving element to move.

Referring also to FIGS. 1, 2, 7, 9, 10, and 12. In some embodiments, the rocker device 10 includes a rocker arm assembly 2 and a rocker 21, and the rocker 21 is disposed on the rocker arm assembly 2. The rocker 21 may be disassembled or fixed to the rocker arm assembly 2. In some embodiments, the rocker 21 is fixedly connected to the rocker arm assembly 2. When the user operates the rocker 21, the rocker arm assembly 2 rotates with a tilting operation of the rocker 21, to meet the rotation requirements of the rocker 21 in different directions and angles.

In some embodiments, the rocker arm assembly 2 includes a first rocker arm 22, a second rocker arm 23, and the rocker 21. The pressing part 211 is disposed on an end of the first rocker arm 22 facing towards the deviating element 3. The first rocker arm 22 may rotate relative to the second rocker arm 23 along a first direction X. The second rocker arm 23 may rotate relative to the supporting base 1 along a second direction Y The first rocker arm 22 rotates with the rotation of the second rocker arm 23. The first direction X and the second direction Y are disposed orthogonally. By the above mode, the first rocker arm 22 and the second rocker arm 23 may rotate around a common center along the first direction X or the second direction Y.

In some embodiments, the second rocker arm 23 defines an installing chamber 233 with an opening. Two opposite ends of the first rocker arm 22 rotate in the installing chamber 233, so that the first rocker arm 22 rotates relative to the second rocker arm 23 along the first direction X. The opening is configured to allow the rocker 21 to pass through.

In some embodiments, the rocker 21 includes a connecting part 212. The connecting part 212 is connected to an end of the first rocker arm 22 away from the deviating element 3. The connecting part 212 and the pressing part 211 are respectively disposed opposite to each other on an upper end and a lower end of the first rocker arm 22. The connecting part 212 may be disassembled or fixed to the first rocker arm 22. The connecting part 212 protrudes from the surface of the second rocker arm 23 through the opening. The connecting part 212 and the pressing part 211 of the rocker 21 are integrated onto the first rocker arm 22, which facilitates the rocker arm assembly 2 to move, reducing rotational friction, and reducing assembly elements. In addition, the connecting part 212 facilitates the subsequent installation of structures such as handles or related shells, which is not limited.

In some embodiments, each of two ends of the first rocker arm 22 is provided with a first fixing shaft 221. The first rocker arm 22 rotates relative to the second rocker arm 23 through the first fixing shaft 221, reducing the frictional resistance between the first rocker arm 22 and the second rocker arm 23. Each of two ends of the second rocker arm 23 is provided with a second fixing shaft 231. The second rocker arm 23 rotates relative to the supporting base 1 through the second fixing shaft 231, reducing the frictional resistance between the second rocker arm 23 and the supporting base 1. By disposing the first fixing shaft 221 and the second fixing shaft 231, the friction resistance between the rocker arm assembly 2 and the supporting base 1 may be reduced, thereby making the reset of rocker 21 more accurate and reducing the possibility of expanding the dead zone of rocker 21.

In some embodiments, the rocker arm assembly 2 may also include two first bearing elements 222. Each first bearing element 222 is embedded in the second rocker arm 23. Each first bearing element 222 is sleeved on a corresponding first fixing shaft 221. The first fixing shafts 221 and the first bearing elements 222 are cooperated with each other, so that the first rocker arm 22 rotates relative to the second rocker arm 23 along the first direction X. The rocker arm assembly 2 includes two second bearing elements 232. Each second bearing element 232 is embedded in the supporting base 1. Each second bearing element 232 is sleeved on a corresponding second fixing shaft 231. The second fixing shafts 231 and the second bearing elements 232 are cooperated with each other, so that the second rocker arm 23 rotates relative to the supporting base 1 along the second direction Y.

By the above mode, the two first bearing elements 222 and the two second bearing elements 232 are added in the rocker arm assembly 2, so that the smoothness of rotation of the first rocker arm 22 relative to the second rocker arm 23 and the smoothness of rotation of the second rocker arm 23 relative to the supporting base 1 are increased. And accordingly, the frictional resistance is effectively reduced, and the smoothness of rotation of rocker arm assembly 2 is improved. The rocker arm assembly 2 hardly forms additional frictional resistance with the supporting base 1, thereby making the reset of rocker 21 more accurate, and reducing the possibility of expanding the dead zone of rocker 21. The pressing part 211 is in direct contact with the first end 31, and the rocker arm assembly 2 is disposed by sleeving the first bearing element 222 on the first fixing shaft 221 and sleeving the second bearing element 232 on the second fixing shaft 231, to effectively reduce the friction resistance, thereby making the reset of rocker 21 more accurate and reducing the possibility of expanding the dead zone of rocker 21.

In some embodiments, the rocker device 10 includes a circuit board 7. The rocker device 10 may be provided with at least two two-dimensional Hall assemblies 81 or at least one three-dimensional Hall assembly (not shown in the figures). When the rocker device 10 includes at least two two-dimensional Hall assemblies 81, at least one of the two ends of the first rocker arm 22 is provided with a first magnet. The circuit board 7 is provided with at least one first Hall sensor. The number of the first Hall sensors corresponds to the number of first magnets. The first Hall sensors and the first magnets are cooperated with each other. When the first rocker arm 22 drives the first magnet to rotate, a distance from the first magnet to the first Hall sensor is changed, to change a magnetic flux sensed by the first Hall sensor, which generates a magnetic flux change. The first Hall sensor senses the magnetic flux change and converts the magnetic flux change into a voltage change, thereby outputting different signals and achieving different increase or decrease functions.

At least one of the two ends of the second rocker arm 23 is provided with a second magnet, and the circuit board 7 is provided with at least one second Hall sensor. The number of the second Hall sensors corresponds to the number of the second magnets. The second Hall sensors and the second magnets are cooperated with each other. A principle of the mutual cooperation between the second Hall sensors and the second magnets is the same as a principle of the mutual cooperation between the first Hall sensors and the first magnets, which is not repeated.

In some embodiments, when the rocker device 10 includes at least one three-dimensional Hall assembly, a third magnet is disposed on a side of the second end 32 away from the rocker 21. The third magnet and a three-dimensional Hall sensor are both on a central axis when the rocker 21 is centered. The three-dimensional Hall sensor may detect three-dimensional coordinates of three different positions in a third magnetic space. The two-dimensional Hall assembly 81 and the three-dimensional Hall assembly are conventional means for those of ordinary skill in the art, which are not limited.

Referring also to FIGS. 2, 5, and 6, in the actual process, due to the rotation of the deviating element 3 in the lever manner, the torque applied to the rocker 21 may be different during the rotation of the rocker 21 in different directions, resulting in different force felt by the users. The inclined surface 2111*a* of the pressing part 211 may be changed to ensure that the torque applied to the rocker 21 is the same when the rocker 21 rotates along different directions. The specific setting method of the inclined surface 2111*a* may be determined according to actual needs, and there is no limit. In addition, the supporting base 1 may be integrally formed. Alternatively, the supporting base 1 may be formed by splicing multiple elements. The method for making the supporting base 1 is not limited here.

Compared with the existing technologies, the rocker device in some embodiments includes the supporting base, the rocker, the deviating element, and the reset assembly. The rocker is provided with the pressing part. The deviating element includes the first end and the second end opposite to each other. The first end is in contact with the pressing part. The reset assembly is disposed on the second end. When the pressing part presses the first end of the deviating element, the second end of the deviating element deviates, and the reset assembly drives the second end of the deviating element to reset. By the above mode, the reset assembly is disposed on the second end of the deviating element, rather than on the first end of the deviating element, to avoid coaxial setting of the rocker and reset mechanism, and to reduce the difficulty of assembling the rocker device. When the reset assembly is defective, it is easy to disassemble and replace the reset assembly. In addition, the deviating element is disposed on the supporting base in the lever manner, and the reset assembly is disposed on the second end of the deviating element. The pressing part of the rocker is in direct contact with the first end of the deviating element. The deviating element does not need to be coaxial with the reset mechanism, reducing the contact area between the deviating element and the supporting base, thereby reducing the friction resistance between the deviating element and the supporting base, improving the accuracy of operating the rocker, and improving the usage experience of the rocker device. Furthermore, it is no need to change the structure of the rocker itself.

The effects of the present disclosure are as follows. Different from the existing technologies, the present disclosure provides a rocker device. The rocker device includes the supporting base, the rocker, the deviating element, and the reset assembly. The rocker is provided with the pressing part. The deviating element includes the first end and the second end opposite to each other. The first end is in contact with the pressing part. The reset assembly is disposed on the second end. When the pressing part presses the first end of the deviating element, the second end of the deviating element deviates, and the reset assembly drives the second end of the deviating element to reset. By the above mode, the reset assembly is disposed on the second end of the deviating element, rather than on the first end of the deviating element, to avoid coaxial setting of the rocker and reset mechanism, and to reduce the difficulty of assembling the rocker device. When the reset assembly is defective, it is easy to disassemble and replace the reset assembly. In addition, the deviating element is disposed on the supporting base in the lever manner, and the reset assembly is disposed on the second end of the deviating element. The pressing part of the rocker is in direct contact with the first end of the deviating element. The deviating element does not need to be coaxial with the reset mechanism, reducing the contact area between the deviating element and the supporting base, thereby reducing the friction resistance between the deviating element and the supporting base, improving the accuracy of operating the rocker, and improving the usage experience of the rocker device. Furthermore, it is no need to change the structure of the rocker itself.

The terms "first", "second", and "third" in the present disclosure are only configured to describe purposes and cannot be understood as indicating the quantity of technical features indicated. Therefore, features limited to "first", "second", and "third" may explicitly or implicitly include at least one of these features. All directional indications (such as up, down, left, right, front, rear, or the like) in some embodiments of the present disclosure are only configured to explain a relative position relationship between components in a specific posture (as shown in the accompanying drawings), a motion situation between the components in the specific posture (as shown in the accompanying drawings), or the like. If the specific posture is changed, the directional indication is also changed accordingly. In addition, the terms "including", "comprising", and "having", as well as any variations of the terms "including", "comprising", and "having", are intended to cover non-exclusive inclusions. For example, a process, method, system, product, or device that includes a series of operations or units is not limited to the listed operations or units, but optionally includes operations or units that are not listed, or optionally includes other operations or units that are inherent to these processes, methods, products, or devices.

The above description are only some embodiments of the present disclosure, and are not intended to limit the scope of the present disclosure. Any equivalent structure or equivalent flow transformation made by using the contents of the specification and accompanying drawings of the present disclosure, or directly or indirectly applied to other related technical fields, is included in the scope of the patent protection of the present disclosure.

What is claimed is:

1. A rocker device, comprising:

a supporting base;

a rocker, provided with a pressing part;

a deviating element, comprising a first end and a second end opposite to each other, wherein the first end is in contact with the pressing part; and a reset assembly, disposed on the second end;

wherein when the pressing part presses the first end of the deviating element, the second end of the deviating element deviates; the reset assembly is configured to drive the second end of the deviating element to reset; the deviating element is pivotally connected to the supporting base through a rotating shaft; and the rotating shaft is located between the first end and the second end, and is closer to the second end than the first end.

2. The rocker device according to claim 1, wherein each of two ends of the deviating element is provided with the rotating shaft, each of two ends of the supporting base is provided with a rotating shaft groove, and the rotating shaft is configured to rotate in the rotating shaft groove; or each of the two ends of the deviating element is provided with the rotating shaft groove, each of the two ends of the supporting base is provided with the rotating shaft, and the rotating shaft is configured to rotate in the rotating shaft groove.

3. The rocker device according to claim 1, wherein a hard layer is disposed on an end face of the first end facing towards the pressing part; and/or the pressing part comprises a bottom wall, and an outer circumference of the bottom wall is provided with an inclined surface.

4. The rocker device according to claim 1, wherein the reset assembly comprises an elastic element configured to reset the deviating element and an adjusting assembly configured to limit the elastic element.

5. The rocker device according to claim 4, wherein the adjusting assembly is adjustable and fixed to the supporting base, and the adjusting assembly is configured to adjust an elastic force of the elastic element.

6. The rocker device according to claim 5, wherein the adjusting assembly comprises a first adjusting element, the first adjusting element passes through the second end and is connected to the supporting base, and the elastic element is sleeved on the first adjusting element; and one end of the elastic element is in contact with an end of the first adjusting element away from the second end, and an other end of the elastic element is in contact with a side surface of the second end away from the supporting base.

7. The rocker device according to claim 6, wherein the first adjusting element passes through the second end and is threaded to the supporting base; and/or the adjusting assembly comprises a first connecting element disposed in the supporting base, and the first adjusting element is threaded to the first connecting element.

8. The rocker device according to claim 5, wherein the adjusting assembly comprises a second adjusting element and a pressing block, and the second adjusting element passes through one end of the pressing block and is connected to the second end; and one end of the elastic element is connected to an other end of the pressing block, and an other end of the elastic element is connected to the supporting base.

9. The rocker device according to claim 8, wherein the second adjusting element is threaded to the second end.

10. The rocker device according to claim 9, wherein the adjusting assembly comprises a second connecting element, the second connecting element is disposed in the second end, and the second connecting element is threaded to the second adjusting element; and at least one snap ring is sleeved on the second adjusting element, and the at least one snap ring is located between the pressing block and the second adjusting element.

11. The rocker device according to claim 8, wherein the second end is provided with a limiting position column parallel to the second adjusting element, and the limiting position column passes through the pressing block.

12. The rocker device according to claim 5, wherein the adjusting assembly comprises a third adjusting element and a driving element, and the third adjusting element is spaced apart from the second end; one end of the elastic element is connected to an end of the third adjusting element away from the second end, and an other end of the elastic element is connected to the second end; and the driving element is located on a side of the third adjusting element away from the elastic element, the driving element is configured to drive the third adjusting element to move towards the second end, and configured to change the elastic force of the elastic element.

13. The rocker device according to claim 12, wherein the driving element comprises a rotating cover;

the rotating cover is configured to rotate relative to the third adjusting element, to adjust the elastic force of the elastic element; and/or a track groove is disposed in the rotating cover, and the third adjusting element is configured to slide in the track groove and abut against the track groove.

14. The rocker device according to claim 1, further comprising a rocker arm assembly, the rocker is fixedly connected to the rocker arm assembly, and the rocker arm assembly is configured to rotate with a tilting operation of the rocker.

15. The rocker device according to claim 14, wherein the rocker arm assembly comprises a first rocker arm and a second rocker arm, and the pressing part is disposed on an end of the first rocker arm facing towards the deviating element; and the first rocker arm is configured to rotate relative to the second rocker arm along a first direction, the second rocker arm is configured to rotate relative to the supporting base along a second direction, and the first direction is orthogonal to the second direction.

16. The rocker device according to claim 15, wherein the second rocker arm defines an installing chamber with an opening, and two ends of the first rocker arm are configured to rotate in the installing chamber; and the rocker comprises a connecting part, and the connecting part is connected to the first rocker arm and protrudes from a surface of the second rocker arm through the opening.

17. The rocker device according to claim 16, wherein each of the two ends of the first rocker arm is provided with a first fixing shaft, the rocker arm assembly comprises two first bearing elements, and each of the two first bearing elements is sleeved on a corresponding one of two first fixing shafts, so that the first rocker arm rotates relative to the second rocker arm; and each of two ends of the second rocker arm is provided with a second fixing shaft, the rocker arm assembly comprises two second bearing elements, and each of the two second bearing elements is sleeved on a corresponding one of two second fixing shafts, so that the second rocker arm rotates relative to the supporting base.

18. The rocker device according to claim 15, further comprising a circuit board, wherein at least one of two ends of the first rocker arm is provided with a first magnet, and the circuit board is provided with at least one first Hall sensor that is matched with the first magnet;

at least one of two ends of the second rocker arm is provided with a second magnet, and the circuit board is provided with at least one second Hall sensor that is matched with the second magnet; or at least one third magnet is disposed on a side surface of the second end away from the rocker, and the circuit board is provided with at least one three-dimensional Hall sensor that is matched with the third magnet.

* * * * *